(12) United States Patent
Gill et al.

(10) Patent No.: US 10,714,087 B2
(45) Date of Patent: *Jul. 14, 2020

(54) SPEECH CONTROL FOR COMPLEX COMMANDS

(71) Applicant: Josh.ai LLC, Denver, CO (US)

(72) Inventors: Timothy Earl Gill, Denver, CO (US); Alex Nathan Capecelatro, Los Angeles, CA (US)

(73) Assignee: Josh.ai LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/517,414

(22) Filed: Jul. 19, 2019

(65) Prior Publication Data

US 2020/0051556 A1    Feb. 13, 2020

Related U.S. Application Data

(63) Continuation of application No. 15/449,825, filed on Mar. 3, 2017, now Pat. No. 10,403,275.

(Continued)

(51) Int. Cl.
| | |
|---|---|
| *G10L 15/22* | (2006.01) |
| *G06F 40/211* | (2020.01) |
| *G06F 40/268* | (2020.01) |
| *G06F 40/289* | (2020.01) |
| *G10L 15/04* | (2013.01) |

(Continued)

(52) U.S. Cl.
CPC .......... *G10L 15/22* (2013.01); *G06F 40/211* (2020.01); *G06F 40/253* (2020.01); *G06F 40/268* (2020.01); *G06F 40/289* (2020.01); *G06F 40/30* (2020.01); *G10L 15/04* (2013.01); *G10L 15/05* (2013.01); *G10L 15/1815* (2013.01);

(Continued)

(58) Field of Classification Search
CPC ..... G10L 15/04; G10L 15/05; G10L 15/1822; G10L 15/1815; G10L 15/22; G06F 17/27; G06F 17/271; G06F 17/2755; G06F 17/2775; G06F 40/20; G06F 40/205; G06F 40/211; G06F 40/253; G06F 40/268; G06F 40/289; G06F 40/30
See application file for complete search history.

(56) References Cited

U.S. PATENT DOCUMENTS

| | | | | |
|---|---|---|---|---|
| 8,595,642 B1* | 11/2013 | Lagassey | ................ | G06F 3/048 715/781 |
| 2001/0056344 A1* | 12/2001 | Ramaswamy | .......... | G10L 15/22 704/235 |

(Continued)

*Primary Examiner* — Eric Yen
(74) *Attorney, Agent, or Firm* — Van Pelt, Yi & James LLP

(57) ABSTRACT

Audio content associated with a verbal utterance is received. An operational meaning of a received verbal utterance comprising a compound input is recognized and determined, at least in part by: determining that a first subset of the received verbal utterance is associated with a first recognized input; determining whether a meaning of a remaining portion of the received verbal utterance other than the first subset is recognized as being associated with a second recognized input; and based at least in part on a determination that the meaning of the remaining portion of the received verbal utterance is recognized as being associated with said second recognized input, concluding that the verbal utterance comprises a compound input comprising the first and second recognized inputs.

19 Claims, 9 Drawing Sheets

Related U.S. Application Data

(60) Provisional application No. 62/367,999, filed on Jul. 28, 2016.

(51) Int. Cl.
*G10L 15/05* (2013.01)
*G10L 15/26* (2006.01)
*G10L 15/18* (2013.01)
*G06F 40/253* (2020.01)
*G06F 40/30* (2020.01)

(52) U.S. Cl.
CPC .......... *G10L 15/1822* (2013.01); *G10L 15/26* (2013.01); *G10L 2015/223* (2013.01)

(56) References Cited

U.S. PATENT DOCUMENTS

| | | | |
|---|---|---|---|
| 2003/0086341 A1* | 5/2003 | Wells | G10L 15/26 369/13.56 |
| 2005/0075874 A1* | 4/2005 | Balchandran | G06F 17/2715 704/231 |
| 2009/0150139 A1* | 6/2009 | Jianfeng | G06F 40/58 704/4 |
| 2013/0018895 A1* | 1/2013 | Harless | G10L 15/1822 707/748 |
| 2013/0166303 A1* | 6/2013 | Chang | G06F 16/7834 704/258 |
| 2015/0120281 A1* | 4/2015 | VanBlon | G06F 40/166 704/9 |
| 2015/0348551 A1* | 12/2015 | Gruber | G10L 15/1822 704/235 |
| 2016/0314791 A1* | 10/2016 | Wang | G10L 15/1815 |

\* cited by examiner

SPEECH CONTROL FOR COMPLEX COMMANDS

CROSS REFERENCE TO OTHER APPLICATIONS

This application is a continuation of co-pending U.S. patent application Ser. No. 15/449,825 entitled SPEECH CONTROL FOR COMPLEX COMMANDS filed Mar. 3, 2017, which claims priority to U.S. Provisional Patent Application No. 62/367,999 entitled SPEECH CONTROL FOR COMPLEX COMMANDS filed Jul. 28, 2016, both of which are incorporated herein by reference for all purposes.

BACKGROUND OF THE INVENTION

Technology advances have increased automation for products, devices, and systems. Typically, a user may control said automation via a user interface that allows them to invoke a function, feature, and/or operation such as by asserting input including a question, statement, and/or a command. There is a need to design and implement user interfaces that require little or no training to learn for a broad userbase, are natural, and/or intuitive.

BRIEF DESCRIPTION OF THE DRAWINGS

Various embodiments of the invention are disclosed in the following detailed description and the accompanying drawings.

DETAILED DESCRIPTION

Figure 1:
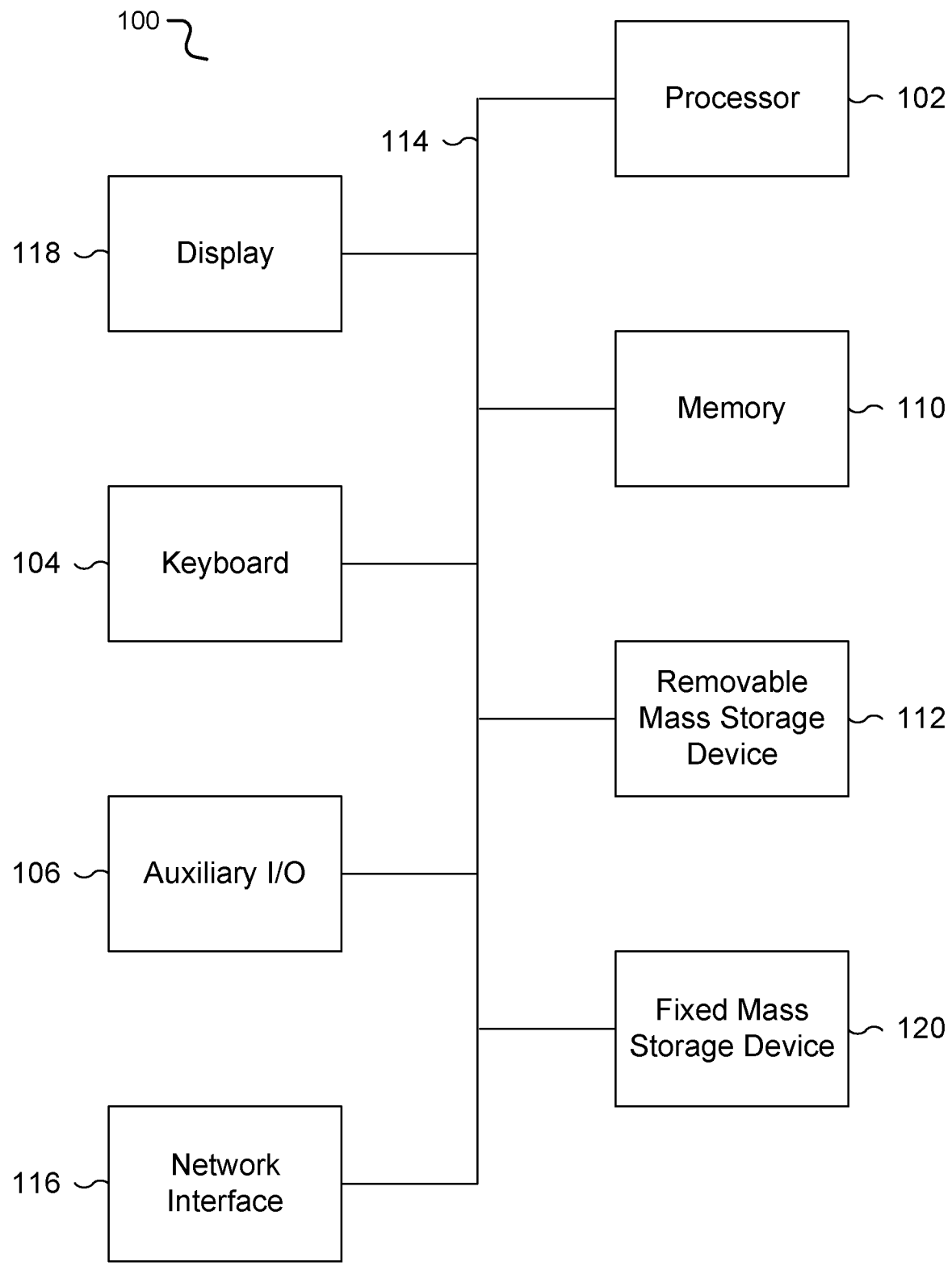
FIG. 1 is a functional diagram illustrating a programmed computer/server system for control of complex input in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A natural language user interface with a technique to process and respond to complex input is disclosed. The user interface supports both voice-based and text-based input and output. Any person having ordinary skill in the art will understand that while examples and embodiments are given in this specification for voice-based complex input, without limitation the techniques disclosed herein are generally suited for text-based complex input and other complex input.

Traditionally, voice-based and/or text-based interfaces have been limited to simple and/or basic commands, and/or constrained to a predefined set of commands. Complex/arbitrary input expressed using natural language, such as what a human might use in making a request of another human, have not traditionally been supported. Likewise, feedback/response to complex input have not seemed natural and/or intuitive to a human user. Throughout this specification an "utterance" is a natural language based input, for example, a verbal utterance or a written utterance such as that typed/texted in on a computer, mobile phone, or tablet. Throughout this specification a "natural language" is any language that has evolved naturally in human beings that is not a computer language, for example English, Spanish, or French.

In one embodiment, for spoken or typed text input, natural language processing ("NLP") is used to execute or evaluate actions, statements, commands, and/or questions, collectively referred to throughout this specification as "input". Throughout this specification, a plurality of (potentially unrelated) input presented together is referred to as "complex input".

In one embodiment, complex input may be spoken into a smartphone, tablet, car, computer, standalone microphone, always-listening microphone, and/or any other form of speaking or typing into an electronic device.

In one embodiment, complex input is used to interact with an automated personal assistant, control smart devices, control Internet-of-Things ("IoT") devices, and/or provide voice control for computers/machinery. Other examples include home automation, question/answer services, chatbots, bots, voice search, and general computer control.

Traditional voice and/or text based control typically attempt to match an input with a single action and do not often consider the possibility of complex commands. Many traditional systems use a common "Bag of Words" approach to parsing language and may have an extraordinarily hard time detecting complex sentences. Traditional Bag of Words takes words and with less regard to order in sentence approaches them using simple recognition and/or search engine queries.

In one embodiment, speech control for complex commands is provided at least in part by separating the input into discrete actions without the need for separating punctuation or words included or otherwise being made explicit by the user. In one embodiment, a serial approach is engaged for this flattened text. In one embodiment, the system processes each action separately, and recombines output for a concise and natural response. In one embodiment, a "rule set" is constructed of many rules, each of which match one or more inputs. The rule set is established prior to the acceptance and response of complex input.

FIG. 1 is a functional diagram illustrating a programmed computer/server system for control of complex input in accordance with some embodiments. As shown, FIG. 1 provides a functional diagram of a general purpose computer system programmed to provide complex input processing in accordance with some embodiments. As will be apparent, other computer system architectures and configurations can be used for complex input processing.

Computer system 100, which includes various subsystems as described below, includes at least one microprocessor subsystem, also referred to as a processor or a central processing unit ("CPU") 102. For example, processor 102 can be implemented by a single-chip processor or by multiple cores and/or processors. In some embodiments, processor 102 is a general purpose digital processor that controls the operation of the computer system 100. Using instructions retrieved from memory 110, the processor 102 controls the reception and manipulation of input data, and the output and display of data on output devices, for example display and graphics processing unit (GPU) 118.

Processor 102 is coupled bi-directionally with memory 110, which can include a first primary storage, typically a random-access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions, for example programmed instructions. For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory, not shown. The processor 102 may also include a coprocessor (not shown) as a supplemental processing component to aid the processor and/or memory 110.

A removable mass storage device 112 provides additional data storage capacity for the computer system 100, and is coupled either bi-directionally (read/write) or uni-directionally (read only) to processor 102. For example, storage 112 can also include computer-readable media such as flash memory, portable mass storage devices, holographic storage devices, magnetic devices, magneto-optical devices, optical devices, and other storage devices. A fixed mass storage 120 can also, for example, provide additional data storage capacity. One example of mass storage 120 is an eMMC or microSD device. In one embodiment, mass storage 120 is a solid-state drive connected by a bus 114. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110, for example RAM, as virtual memory.

In addition to providing processor 102 access to storage subsystems, bus 114 can be used to provide access to other subsystems and devices as well. As shown, these can include a display monitor 118, a communication interface 116, a touch (or physical) keyboard 104, and one or more auxiliary input/output devices 106 including an audio interface, a sound card, microphone, audio port, audio recording device, audio card, speakers, a touch (or pointing) device, and/or other subsystems as needed. Besides a touch screen, the auxiliary device 106 can be a mouse, stylus, track ball, or tablet, and is useful for interacting with a graphical user interface.

The communication interface 116 allows processor 102 to be coupled to another computer, computer network, or telecommunications network using a network connection as shown. For example, through the communication interface 116, the processor 102 can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Throughout this specification "network" refers to any interconnection between computer components including the Internet, Bluetooth, WiFi, 3G, 4G, 4GLTE, GSM, Ethernet, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor 102 through communication interface 116.

An auxiliary I/O device interface, not shown, can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: flash media such as NAND flash, eMMC, SD, compact flash; magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer/server system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
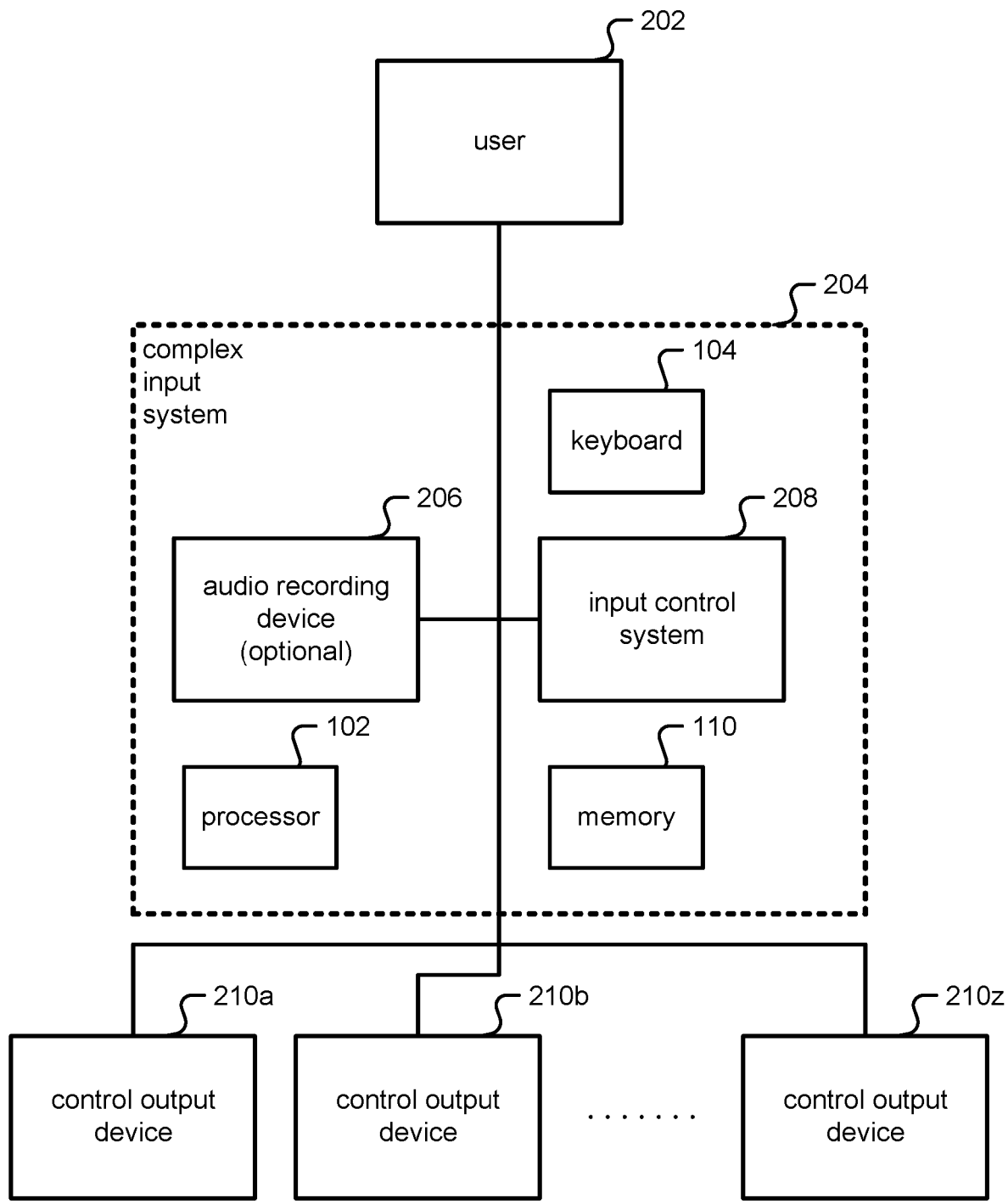
FIG. 2 is a block diagram illustrating an embodiment of a system for complex input processing.

FIG. 2 is a block diagram illustrating an embodiment of a system for complex input processing. User (202) is coupled to complex input system (204), either through an optional audio recording device (206) if by way of speech, or directly to the input control system (208) if by way of written word, for example by typing or texting. In one embodiment, complex input system (204) is a computer system as shown in FIG. 1 and includes processor (102) and memory (110). In one embodiment, an optional physical, phone, touchscreen, and/or virtual keyboard (104) is included for typing or texting. The audio recording device (206) is coupled to the input control system (208) as well. After complex input processing the input control system (208) may be coupled to one or more control output devices (210), here shown with three devices (210*a*), (210*b*), and (210*z*).

Figure 3:
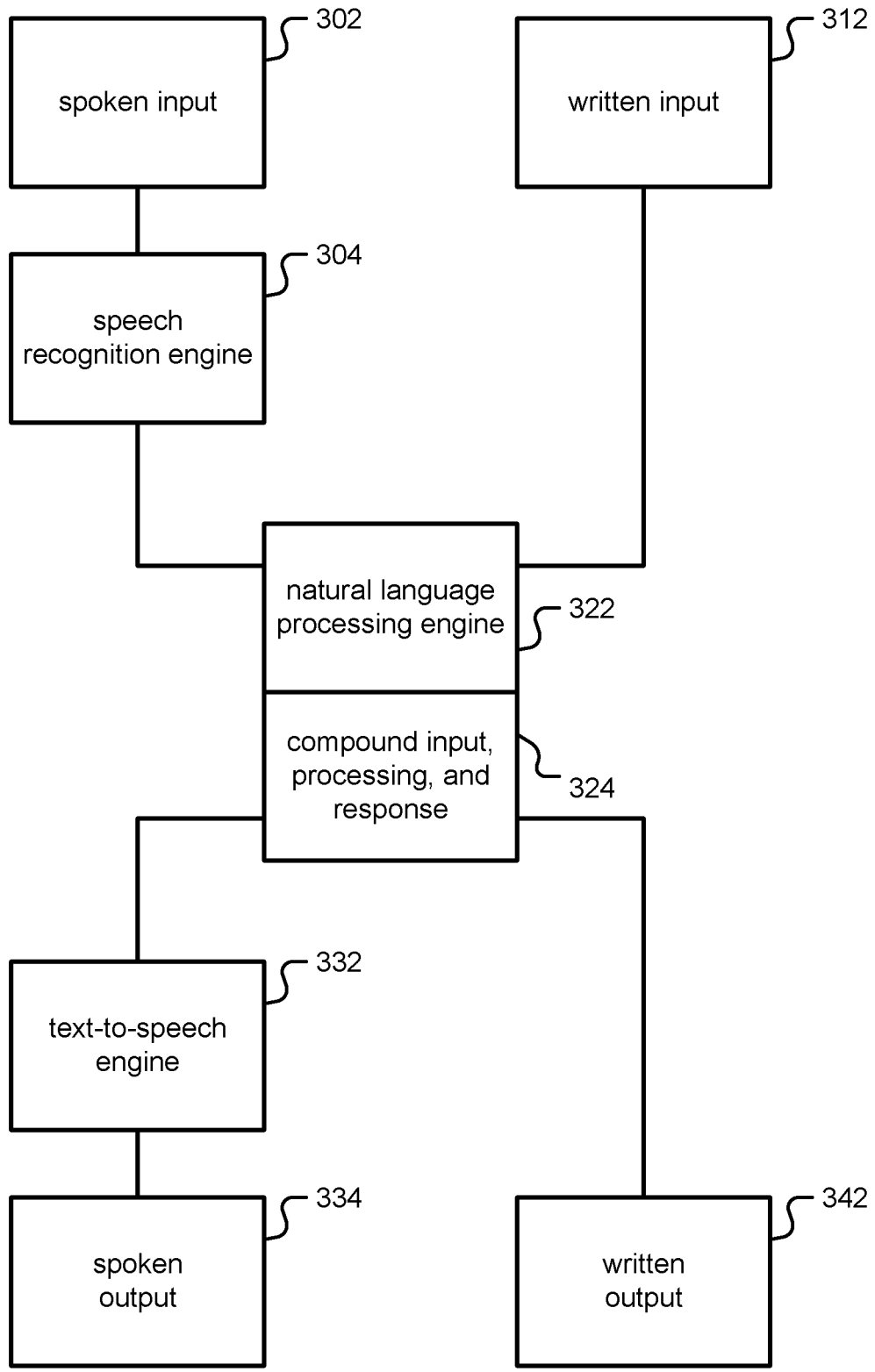
FIG. 3 is a block diagram illustrating an embodiment of a system for complex input speech and written processing.

FIG. 3 is a block diagram illustrating an embodiment of a system for complex input speech and written processing. In one embodiment, the system of FIG. 3 is the complex input system (204) in FIG. 2.

As FIG. 3 illustrates, input may be spoken and/or written, and output may be spoken and/or written. Spoken input (302) is processed by a speech recognition engine (304) before being passed to the natural language processing engine (322). Written input (312) may be processed directly by the natural language processing engine (322). Note that in some cases, the written input (312) may have little or no punctuation, capitalization, and/or proper nouns recognized. Natural language processing engine (322) applies rules and couples the system for complex/compound input, processing, and response (324). User notification of responses includes written output (342) from system (324), and may include a text-to-speech engine (332) to provide spoken output (334) as well.

Figure 4:
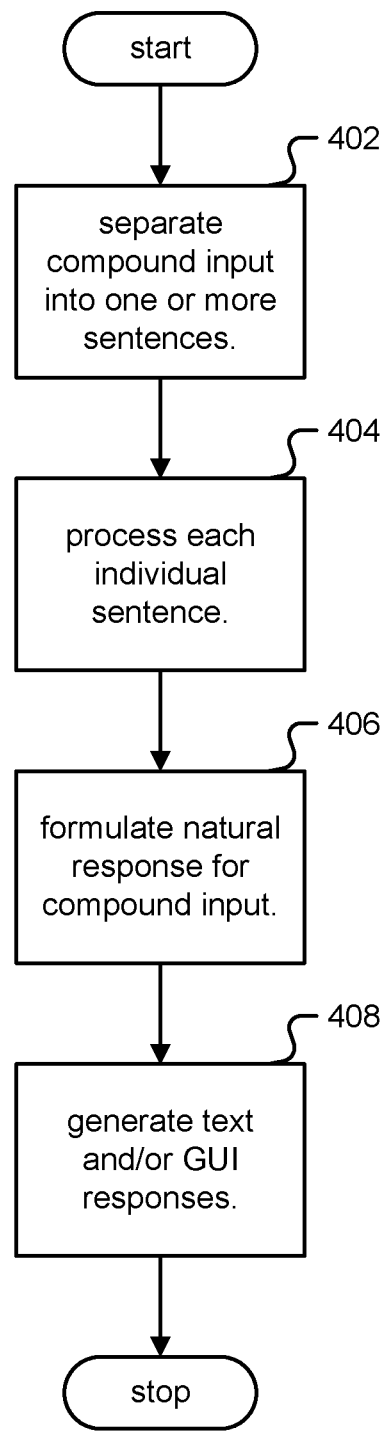
FIG. 4 is a flow chart illustrating an embodiment of a method for complex input speech and written processing.

FIG. 4 is a flow chart illustrating an embodiment of a method for complex input speech and written processing. In one embodiment, the method of FIG. 4 is included in the natural language processing engine (322) and/or processing system (324).

In step 402, complex input is separated into one or more sentences. Throughout this specification a "sentence" is associated with a single input, such as a single command or single question. Input comprising a plurality of sentences is considered a complex input, also known as a compound input. For example, a compound input may be "Turn on the kitchen lights, play classical music" which is separated into "Turn on the kitchen lights" and "Play classical music."

In step 404, after successfully parsing the compound input into its separate sentences, each individual action, question, statement, and/or command is addressed and processed. In the example given above, kitchen lights may be turned on and classical music may be played.

In step 406, a natural and efficient response is formulated for the compound input and subsequent processing. For example, a formulated response may be "Sure." or "The lights are now on." In step 408, text and/or GUI responses are generated based on the formulated response. In one embodiment, the text response from step 408 may be sent to a text-to-speech engine to recite the response to the user (334).

Figure 5:
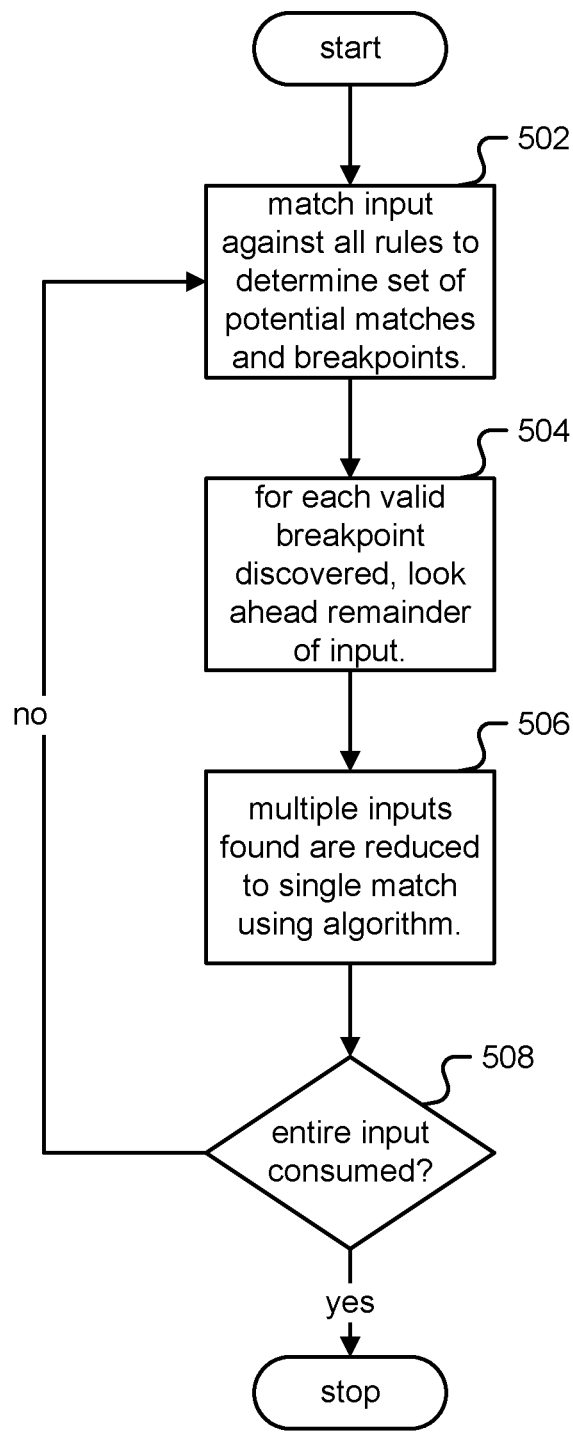
FIG. 5 is a flow chart illustrating an embodiment of a method for parsing compound input.

FIG. 5 is a flow chart illustrating an embodiment of a method for parsing compound input. In one embodiment, the method of FIG. 5 is part of step 402 in FIG. 4.

A user may speak or type their compound input. In the event that a user types, the typed input is a written text. In the event that a user speaks, the audio is recorded and run through a speech-to-text (STT) engine that converts the recordation to a written text.

In step 502, the system matches the beginning of the input against all rules to determine a set of potential matches and breakpoints. In one embodiment, a period, exclamation mark, and/or question mark is assumed to separate sentences and these are initially placed between every word to break compound input into as many discrete sentences as possible. As discrete sentences are deemed to be of low score by checking against known rules/rule sets, and/or otherwise determined not to make sense, periods are removed/moved. Often several matches are found. In one embodiment, synonyms are also parsed at the rule engine stage, for example "turn on" may be represented by "turn on", "switch on" and "power on". In one embodiment, other approaches besides a rules-based approach are used to recognize and determine the compound input, including a modified bag of words approach, a cognitive process, and/or a probabilistic/statistical process.

In one embodiment, the score of a candidate sentence is quantified by a quality metric that is decreased for sentences that make less sense. The quality metric may be a measure of:

sentence length;
key phrases from a database;
a ratio of sentence lengths from surrounding sentences; and
overall confidence based on rules, cognitive and/or statistical processes.

In one embodiment, quality metrics may vary by language. For example quality metrics for English may different from those of Spanish.

In step 504, for each valid breakpoint discovered, the system looks ahead to see whether the remainder of the input matches a rule as well, or at a minimum that it begins with a common sentence start or separator word such as "what", "then", or "and". In one embodiment, several hundred such separator words are catalogued and used to define a sentence boundary.

In step 506, the multiple inputs found are reduced to a single match for the first sentence of the input using an algorithm to determine the "best" match. In one embodiment, better matches are those matches that are longer and/or the matches that have more specific features extracted. In the event (508) that the entire input is not yet consumed, control is returned to step 502, otherwise the process ends.

In some embodiments, a recursive version is implemented (not shown), in which each possible breakpoint is scanned recursively, generating a tree of possible separations. Then a more complex determination of which set of separations represent the best match is performed as a final step. The recursive version may be useful for certain rule sets.

Rules and Rule Sets.

By way of example, a set of simple rules includes:
1. (turn|switch) <on|off> the <device> [in the <room>]
2. [in the <room>] make the <device> <color>
3. <lock|unlock> the door
4. What is the population of <location>?
5. ?unknown Rule sets more realistic than the five given above may be more complex and/or permit more functionality.

The rule #5 ?unknown is matched when a user asks a question that is not otherwise matched by another rule. Similar catch all rules may exist for other sentence types like statements and commands.

For example, rule #1 matches user input such as:
i. "turn on the fans"
ii. "can you please turn off the lights now"
iii. "and so what pray tell is the population of India please?"

Appropriate prefixes, suffixes, and/or infixes underlined in user input (a) through (c) may be ignored by the system. The emphasized word India is extracted with the rule fragment [What is the population of <location>?] and carried via the rule as additional location information.

Another example showing ignored utterance fragments and extracted information is that rule #2 matches user input such as:
i. "make the lights green"
ii. "when you can please make the lights navy blue"
iii. "in the bedroom make the lights pink"

Compound Input Analysis.

An example of a compound input is the user utterance: "turn on the lights make them green". As described below the head of the sentence is parsed word by word until it matches "turn on the lights" in the example rule #1. Removing this rule leaves "make them green" which is matched by rule #2, in part because <device> in the rule #2 is mapped to the word "them", which in turn recognizes prior match for <device> as "lights". Thus, the rule-based interpretation of the user utterance is "Turn on the lights." And "Make the lights green."

Another example of a compound input is the user utterance: "turn on the lights and in the kitchen make them green". In this case, the word "and" is used to explicitly make and test separation of the sentences.

Another example of a compound input is the user utterance: "turn on the lights in the kitchen make them green". This utterance has two possible interpretations:
a. "Turn on the lights. In the kitchen make them green."; and
b. "Turn on the lights in the kitchen. Make them green."

Either may be valid and have different outcomes. The example (a) would turn on all the lights, then only make the kitchen lights green. The example (b) would only turn on the kitchen lights and make them green. In one embodiment, with this ambiguity the interpretation with the longest sentence first, (b), is selected as it may be more likely to be correct.

Another example of a compound input is the user utterance: "what is the population of India in the kitchen turn off the lights". There are two possible break points:
"What is the population of India? In the kitchen turn off the lights."; and
"What is the population of India in the kitchen? Turn off the lights."

Either may be syntactically valid, example (b) may be determined to be nonsensical to determine a population of India in a user's kitchen, and thus is assigned a lower score. In this case, (a) is selected as it may be more likely to be correct.

Example

With traditional services, a user would be compelled to individually query commands. For example a user would start with, "Turn on the kitchen lights," wait for, "The lights in the kitchen are now on," then say "Play classical music," and wait for, "Here's some classical music."

By contrast, a compound input approach permits combining these commands into a single complex command. An example in the home automation domain without limitation:
Use of "and"—"Turn on the kitchen lights and play classical music.";
Use of "then"—"Turn on the kitchen lights then play classical music.";
Use of a comma—"Turn on the kitchen lights, play classical music, and open the garage.";
Use of no explicit separator—"Turn on the kitchen lights play classical music."; and
Combination—"Turn on the lights in the kitchen and living room, then play Bob Dylan on Spotify, unlock the front door, open the shades in the living room, and turn on the lights in there."

Outside the home control domain, compound input enables control of other devices, the answering of questions, and permits users to make complex statements. Other examples:
Use of "and"—"What is the population of India and how far away is Japan?"
Use of no explicit separator—"What's the capital of California what is the square root of 16 who is Tim Cook?"
Other actions—"Send a text to John telling him I'll be 5 minutes late and call me an Uber."
Other actions—"Play classical music find me a nearby coffeeshop."

Figure 6:
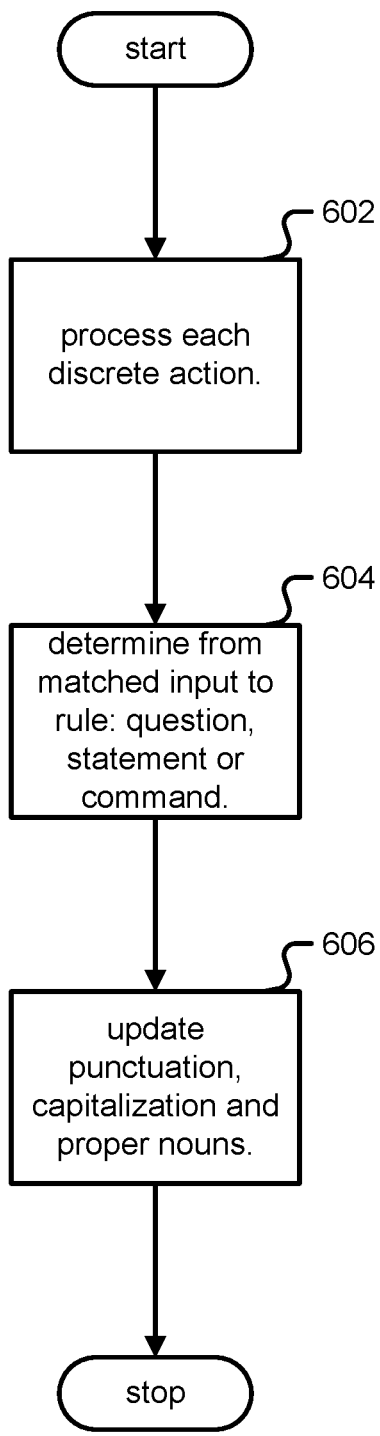
FIG. 6 is a flow chart illustrating an embodiment of a method for processing compound input.

FIG. 6 is a flow chart illustrating an embodiment of a method for processing compound input. In one embodiment, the method of FIG. 6 is part of step 404 in FIG. 4.

In step 602, each sentence of the compound input separated using the process of FIG. 5 is processed. In the event a user interface is present, in step 604 the matching rule for a given sentence is used to determine whether the match is to a question, statement or command. This allows the system to update the original input, inserting appropriate punctuation and sentence capitalization in step 606.

In step 606, beyond sentence punctuation, proper nouns may be modified as well. For example, the speech recognition engine (304) may interpret spoken input as the text "Play something by the notorious big." The system maps "the notorious big" to an artist name and updates the input text to "Play something by The Notorious B.I.G." correcting both the artist name and its capitalization.

Figure 7:
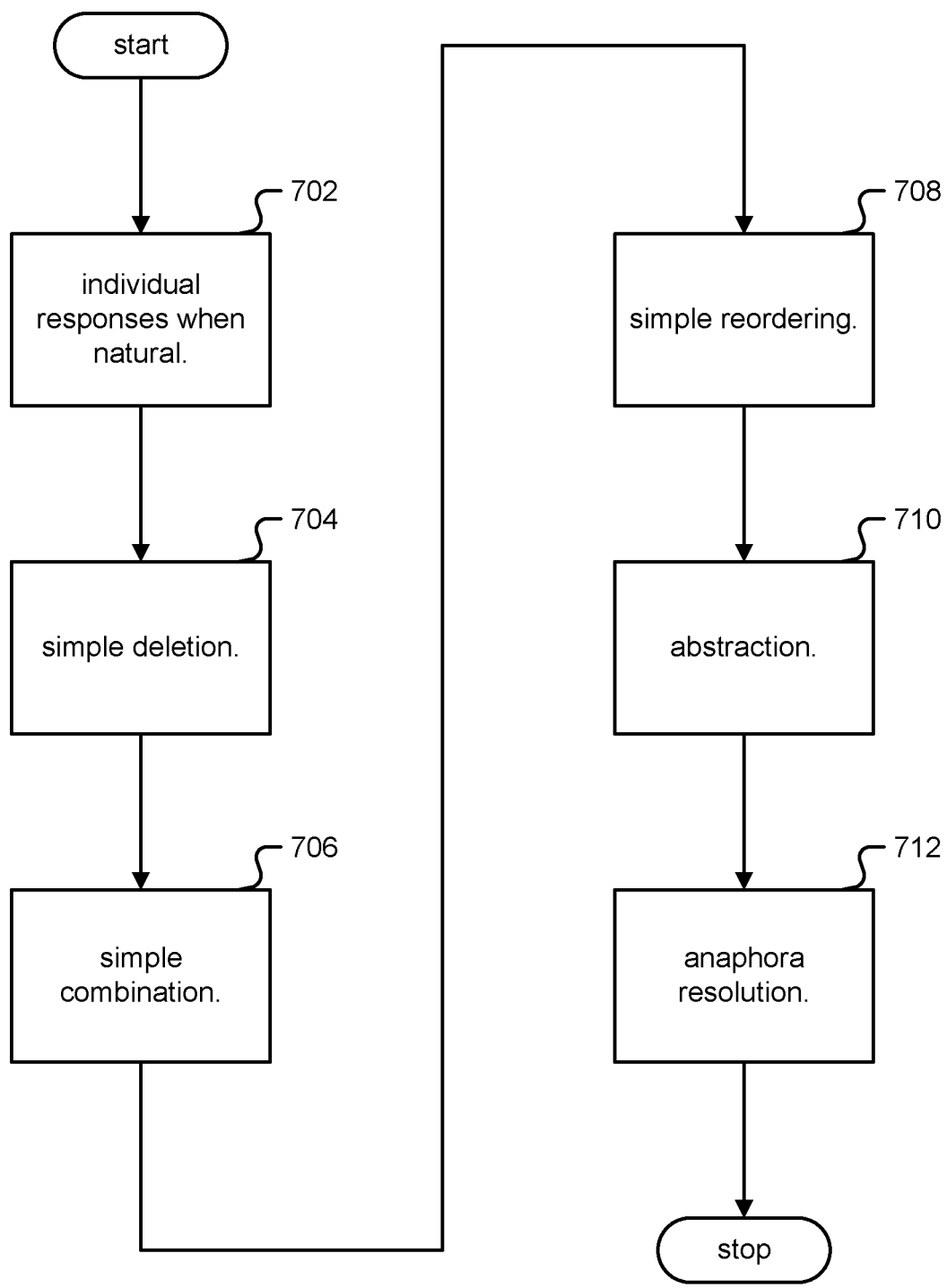
FIG. 7 is a flow chart illustrating an embodiment of a method for responding to compound input.

FIG. 7 is a flow chart illustrating an embodiment of a method for responding to compound input. In one embodiment, the method of FIG. 7 is part of step 406 in FIG. 4. In one embodiment, when responding to the user, the system is configured to sound more natural and intuitive. The steps shown in FIG. 7 are various ways to achieve this goal and are not mutually exclusive.

In step 702, a simple response to formulate is to individually respond to an action. For example, it may be perfectly reasonable to respond to, "What's the weather in Los Angeles and what time is it?" with "It's 75 degrees and sunny in Los Angeles. It's 3:59 PM."

That is, asking a traditional speech system to "Turn on the lights and play classical music" would result in either a failure, or the traditional system may selectively act on one of the commands. With the compound input approach a response may be "The lights are now on. Here's classical music." The compound input system, in addition to responding accordingly, would also act on the commands, and follow up on any failure in control with a response like "The lights are now on, but unfortunately I don't have any classical music accessible." In this example it makes less sense to combine the two results as they are mutually exclusive, hence each response is kept an individual response.

In other instances it may be more natural to ignore or combine sentences. For example, it might be preferable to respond to, "Turn on the lights in the kitchen and turn off the music." with, "Sure thing, boss." In one embodiment, one or more of the following steps may be employed to provide a more natural response.

In step 704, a "simple deletion" rule dynamically associates an "importance" with each response. Less "important" responses may be simply dropped if more "important" responses exist.

For example, a user states: "It's late. I have to go!" Without simple deletion the response might be: "Yes it is. Ok, see you later." With simple deletion the response could be: "Ok, see you later."

Some human users may add filler language before and after a command. For example, instead of saying, "Open the door," a user may say, "Hi Josh, would you open the door?" With the breakpoint analysis this may be parsed as, "Hi Josh," and, "Would you open the door?" While both of these are perfectly adequate queries, it may seem verbose to hear a response, "Hello there. Opening the door." Because the first action, "Hi Josh," is of lower importance than the command, the initial "Hello there" may be deleted and the response simplifies to, "Opening the door." This technique is used more as the complex command gets longer and filled with less meaningful commands.

In step 706, "simple combination" addresses an observation that sometimes sentences refer to related things and though they are spoken as separate sentences, it makes the most sense to combine the responses into a single response. In one embodiment, complex special case text processing is used for simple combination. In one embodiment, rules are written in such a way that they understand how to combine prior responses.

For example, a user states: "Turn on the lights in the kitchen and then light up my bedroom." Without simple combination, the response might be: "The lights in the kitchen are now on. The lights in your bedroom are now on." With simple combination the response could be: "The lights in the kitchen and your bedroom are now on".

While it may be natural for a user to say "turn on the lights in the kitchen and start the fan in there," the full response may be verbose: "The lights in the kitchen are now on. The fan in the kitchen is now on." as it would be handled without combination or simplification. In one embodiment, similar devices, rooms, and/or actions are used for simple combination when appropriate. The combined response in this case may be, "The lights and fan are now on in the kitchen." In some instances it may be deemed unnecessary to include the location: "The lights and fan are now on."

In step 708, "simple reordering" addresses that in addition to using simple deletion and/or simple combination with responses, the output may also be reordered to improve natural flow using rules or text processing to gather like elements.

For example, a user states: "Turn on the kitchen lights. Play classical music there. Turn on the bedroom lights. Then play classical music there as well." Without simple reordering, the response might be: "The lights are now on in the kitchen and I am playing classical music there. The lights are now on in the bedroom and I am playing classical music there." With simple reordering the response could be: "The lights are now on in the kitchen and bedroom. Classical music is playing in the kitchen and bedroom."

In one embodiment, the order of responses may be changed and combined to make the response simpler. For a response to a user's compound input: "Turn on the lights in the kitchen, play Coldplay, and turn on the lights in the bedroom." The response without simplification or reordering after breakpoint analysis forms three separate commands would be, "The kitchen lights are now on. Here's Coldplay. The lights in the bedroom are now on." The action related to kitchen lights and bedroom lights are similar and by reordering playing Coldplay and turning on bedroom lights results in "The kitchen and bedroom lights are now on. Here's Coldplay". Simple reordering is important to explicitly build and design for as it mimics natural language processing.

In step 710, "abstraction" addresses that in some cases the user issues a complex input wherein two or more actions have roughly equal weighting, but cannot be combined.

For example, a user states: "turn on the lights in the kitchen and stop the outside music." In this case, ignoring one response or trying to combine will not work, and it may be most natural to abstract the response to something like, "Sure thing, boss."

In one embodiment, responses that are too detailed yet impossible to combine are abstracted. For example, consider the compound input, "Turn on the lights in the living room, turn off the fan, and open the garage door." A response without simplification or abstraction would be, "The lights are now on in the living room. Turning off the fan. The garage door is now open." While overly verbose, simple combination and/or simple deletion cannot easily be applied to this response, and is thus a suitable candidate for abstracting the response to "Sure thing, boss." While not descriptive, this answer accounts for the various actions while shortening the response.

In step 712, "anaphora resolution" addresses that in some cases responses can be made more natural and concise with the aid of anaphora resolution. By keeping tracking of the referent, often a noun phrase, verb, whole sentence, or paragraph, responses can be significantly shortened.

For example a user states: "turn off the black Sonos speaker in the living room." Without anaphora resolution, the response might be: "The black Sonos speaker in the living room is now off." With anaphora resolution the response could be: "It's now off."

In one embodiment, anaphora resolution is used when the response should be descriptive but it is not deemed necessary to cite the entire noun, verb, sentence, or whole paragraph. For example, a user's compound input: "Play Bob Dylan in the northwest kitchen on the first floor in the big house." A response without simplification or anaphora resolution may be "Now playing Bob Dylan in the northwest kitchen on the first floor in the big house." Simplification using anaphora resolution may reduce the response to: "Now playing Bob Dylan there." The system may require initialization to coordinate what information is important to convey and what information is superfluous to permit anaphora resolution, but the benefit is a greatly reduced response.

Combination.

In one embodiment, the techniques in steps 702-712 are used in combination to provide a natural response to a user. For example a user's compound input is: "Hi Josh, can you turn on the lights in the kitchen, play music in the kitchen, and turn on the fan in there too?" The response without simplification may be, "Hi there. The lights are now on in the kitchen. Now playing music in the kitchen. Turning on the fan in the kitchen." By applying simple deletion (704) the initial "Hi there." is removed. Anaphora resolution (712) replaces "the kitchen" with "there" and simple reorder (708) followed by simple combination (706) results in a more natural response: "The lights, fan, and music are now on in there."

Examples

For a user utterance "turn on the lights in the kitchen", a response may be one of: (i) "I've turned on the lights in the kitchen." or (ii) "The lights are now on."

For a user utterance "turn on the lights in the kitchen in the bedroom turn on the lights and turn on the lights in the garage" the system through breakpoint analysis splits this into three sentences. Without simplification, the response may be: "The lights are now on." "I've turned on the lights in the bedroom." "The lights are now on." With simple combination in recognizing they are all light on requests, a reduced and more natural response is: "I've turned on the lights; The lights are now on in the kitchen, bedroom and garage."

For a user utterance "turn off the lights in the kitchen make them blue lock the door switch on the fans", using varying degrees of abstraction the response for these unrelated input sentences may be one of: "I've handled the lights, lock and fans.", "You've got it boss." or "OK. Will do."

When one of the sentences is a question, for example "turn off the lights in my bedroom what is the population of India and shut off the fans", the system in combination using the steps in FIG. 7 may produce as response: The population of India is 1.173 billion and I've taken care of the lights and fans."

Figure 8:
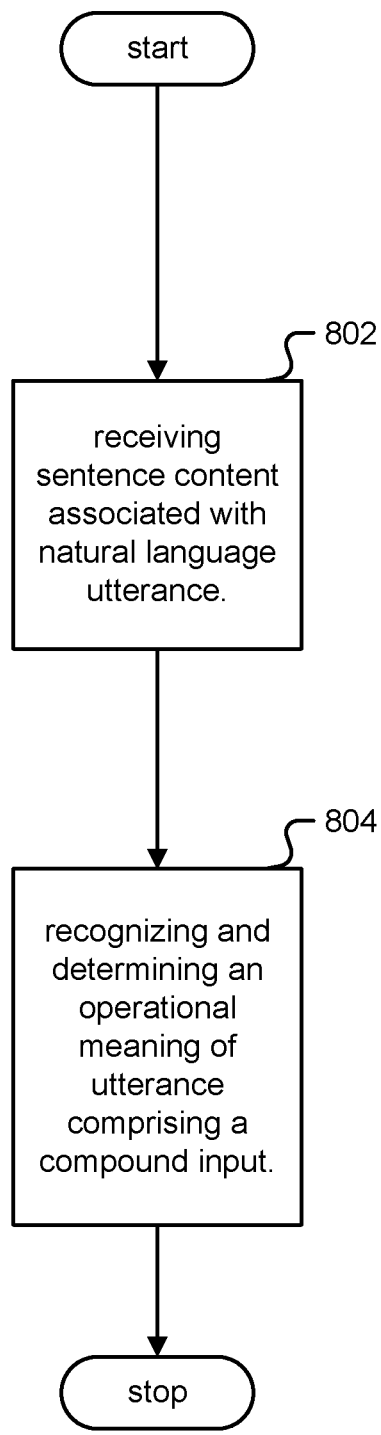
FIG. 8 is a flow chart illustrating an embodiment for speech control of complex commands.

FIG. 8 is a flow chart illustrating an embodiment for speech control of complex commands. In one embodiment, the method of FIG. 8 is carried out by the system 204 in FIG. 2 and/or the system(s) depicted in blocks 322/324 in FIG. 3.

In step 802, sentence content associated with a natural language utterance is received. In one embodiment, a communication interface for a system is configured to receive audio content associated with a verbal utterance. The communication interface may be coupled with at least one of the following: microphone, audio port, audio recording device, and audio card. The natural language utterance may be entirely typed or written (312) or spoken (302) and then processed by a speech recognition engine (304), for example using a STT engine on the audio content to process a verbal utterance.

In step 804, an operational meaning of said utterance comprising a compound input is recognized and determined. In one embodiment, a processor coupled to the communication interface is configured to recognize and determine the operational meaning of the received utterance.

Figure 9:
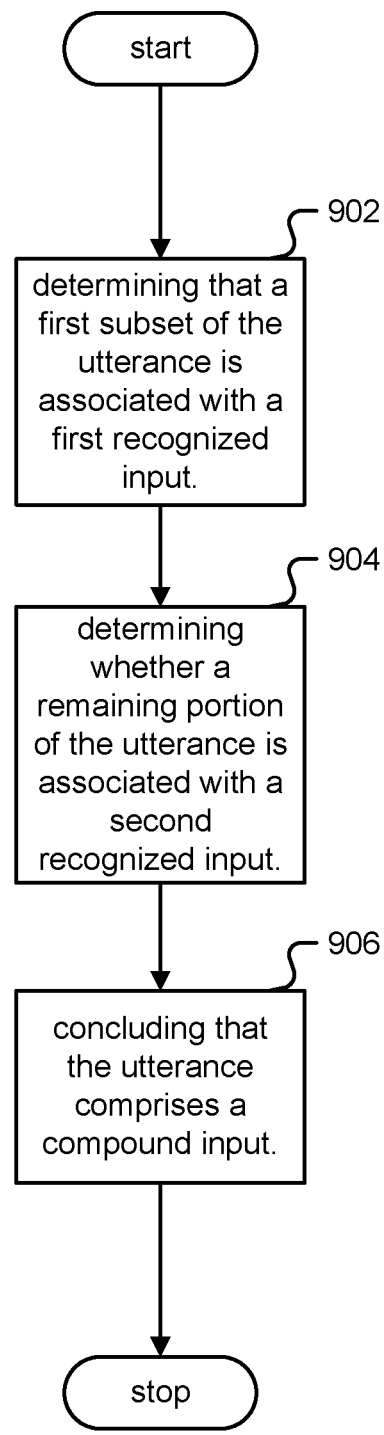
FIG. 9 is a flow chart illustrating an embodiment for recognizing and determining a compound input.

FIG. 9 is a flow chart illustrating an embodiment for recognizing and determining a compound input. In one embodiment, step 804 of FIG. 8 is carried out at least in part by the technique in FIG. 9. In step 902, it is determined that a first subset of the received verbal utterance is associated with a first recognized input. In step 904, it is determined whether a meaning of a remaining portion of the received verbal utterance other than the first subset is recognized as being associated with a second recognized input. In step 906, based at least in part on a determination that the meaning of the remaining portion of the received verbal utterance is recognized as being associated with said second recognized input, it is concluded that the verbal utterance comprises a compound input comprising the first and second recognized inputs.

In one embodiment, determining that the first subset of the received verbal utterance is associated with the first recognized input comprises determining the first recognized input is a candidate for being associated. In one embodiment, determining that the first subset of the received verbal utterance is associated with the first recognized input comprises determining the first recognized input is of a prescribed confidence for being associated.

In one embodiment, determining whether the meaning of the remaining portion of the received verbal utterance other than the first subset is recognized as being associated with the second recognized input includes determining the second recognized input includes a second verb and second object. In one embodiment, determining whether the meaning of the remaining portion of the received verbal utterance other than the first subset is recognized as being associated with the second recognized input includes determining the second recognized input includes a second object to be associated with a first verb of the first recognized input.

In one embodiment, determining that the first subset of the received verbal utterance is associated with the first recognized input is based at least in part on a breakpoint analysis. The breakpoint analysis may comprise using rule matching on a sentence fragment prior to a proposed sentence boundary. The breakpoint analysis may comprise using separator words to propose sentence boundaries. The breakpoint analysis may comprise using separator words to propose sentence boundaries.

In one embodiment, a sorting rule matching is used to determine whether a given input is at least one of the following: a question, a statement, and a command. In one embodiment, the system may be further configured to: insert appropriate punctuation into a written representation of the verbal utterance based at least in part on the sorting rule matching; capitalize sentences associated with a written representation of the verbal utterance based at least in part on the sorting rule matching; and modify proper nouns of a written representation of the verbal utterance based at least in part on the sorting rule matching.

In one embodiment, determining a natural response to the compound input based on at least one of the following: simple deletion, simple combination, simple reordering, abstraction and anaphora resolution. Simple deletion may comprise using a rule that determines importance with candidate responses and deletes less important responses. Simple combination may comprise using at least one of a rule and a special-case text processing to combine a plurality of candidate responses into a more natural response. Abstraction may comprise determining the compound input have equal weighting of importance and cannot be combined. Anaphora resolution may comprise tracking a referent to shorten a response.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a communication interface configured to receive a user utterance;
a processor coupled to the communication interface and configured to recognize and determine an operational meaning of the received user utterance, at least in part by:
determining that a first subset of the received user utterance is associated with a first recognized input, comprising at least in part:
placing a breakpoint between every word of the received user utterance at least in part to separate sentences between breakpoints; and
removing a given breakpoint when it is at least in part determined that a candidate sentence associated with the given breakpoint is of low score quantified by a quality metric that is decreased for sentences that make less sense;
determining whether a meaning of a remaining portion of the received user utterance other than the first subset is recognized as being associated with a second recognized input; and
based at least in part on a determination that the meaning of the remaining portion of the received user utterance is recognized as being associated with said second recognized input, concluding that the received user utterance comprises a compound input comprising the first and second recognized inputs.

2. The system of claim 1, wherein the communication interface is coupled with at least one of the following: touch keyboard, physical keyboard, virtual keyboard, touchscreen, microphone, audio port, audio recording device, and audio card.

3. The system of claim 1, wherein determining that the first subset of the received user utterance is associated with the first recognized input comprises determining the first recognized input is a candidate for being associated.

4. The system of claim 1, wherein determining that the first subset of the received user utterance is associated with the first recognized input comprises determining the first recognized input is of a prescribed confidence for being associated.

5. The system of claim 1, wherein determining whether the meaning of the remaining portion of the received user utterance other than the first subset is recognized as being associated with the second recognized input includes determining the second recognized input includes a second verb and second object.

6. The system of claim 1, wherein determining whether the meaning of the remaining portion of the received user utterance other than the first subset is recognized as being associated with the second recognized input includes determining the second recognized input includes a second object to be associated with a first verb of the first recognized input.

7. The system of claim 1, further comprising using a speech-to-text engine on audio content to process the user utterance.

8. The system of claim 1, wherein determining that the first subset of the received user utterance is associated with the first recognized input is based at least in part on a breakpoint analysis.

9. The system of claim 8, wherein the breakpoint analysis comprises using rule matching on a sentence fragment prior to a proposed sentence boundary.

10. The system of claim 8, wherein the breakpoint analysis comprises using separator words to propose sentence boundaries.

11. The system of claim 1, wherein a sorting rule matching is used to determine whether a given input is at least one of the following: a question, a statement, and a command.

12. The system of claim 11, further comprising:
inserting appropriate punctuation into a written representation of the user utterance based at least in part on the sorting rule matching;
capitalizing sentences associated with a written representation of the user utterance based at least in part on the sorting rule matching; and
modifying proper nouns of a written representation of the user utterance based at least in part on the sorting rule matching.

13. The system of claim 1, further comprising determining a natural response to the compound input based on at least one of the following: simple deletion, simple combination, simple reordering, abstraction and anaphora resolution.

14. The system of claim 13, wherein simple deletion comprises using a rule that determines importance with candidate responses and deletes less important responses.

15. The system of claim 13, wherein simple combination comprises using at least one of a rule and a special-case text processing to combine a plurality of candidate responses into a more natural response.

16. The system of claim 13, wherein abstraction comprises determining the first and second recognized inputs have equal weighting of importance and cannot be combined.

17. The system of claim 13, wherein anaphora resolution comprises tracking a referent to shorten a response.

18. A method, comprising:
receiving a user utterance;
recognizing and determining an operational meaning of the received user utterance, at least in part by:
determining that a first subset of the received user utterance is associated with a first recognized input, comprising at least in part:
placing a breakpoint between every word of the received user utterance at least in part to separate sentences between breakpoints; and
removing a given breakpoint when it is at least in part determined that a candidate sentence associated with the given breakpoint is of low score quantified by a quality metric that is decreased for sentences that make less sense;
determining whether a meaning of a remaining portion of the received user utterance other than the first subset is recognized as being associated with a second recognized input; and
based at least in part on a determination that the meaning of the remaining portion of the received user utterance is recognized as being associated with said second recognized input, concluding that the user utterance comprises a compound input comprising the first and second recognized inputs.

19. A computer program product, the computer program product being embodied in a non-transitory computer readable storage medium and comprising computer instructions for:

receiving a user utterance;

recognizing and determining an operational meaning of the received user utterance, at least in part by:
  determining that a first subset of the received user utterance is associated with a first recognized input, comprising at least in part:
    placing a breakpoint between every word of the received user utterance at least in part to separate sentences between breakpoints; and
    removing a given breakpoint when it is at least in part determined that a candidate sentence associated with the given breakpoint is of low score quantified by a quality metric that is decreased for sentences that make less sense;
  determining whether a meaning of a remaining portion of the received user utterance other than the first subset is recognized as being associated with a second recognized input; and
  based at least in part on a determination that the meaning of the remaining portion of the received user utterance is recognized as being associated with said second recognized input, concluding that the user utterance comprises a compound input comprising the first and second recognized inputs.

* * * * *